US008190999B2

(12) United States Patent
Chen et al.

(10) Patent No.: US 8,190,999 B2
(45) Date of Patent: May 29, 2012

(54) SYSTEM AND METHOD FOR IN-CONTEXT, TOPIC-ORIENTED INSTANT MESSAGING

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2470 days.

(21) Appl. No.: 10/850,399

(22) Filed: May 20, 2004

(65) Prior Publication Data

US 2005/0262199 A1 Nov. 24, 2005

(51) Int. Cl.
G06F 3/00 (2006.01)
(52) U.S. Cl. ........................................ 715/753; 715/758
(58) Field of Classification Search .................. 715/753, 715/758
See application file for complete search history.

(56) References Cited

U.S. PATENT DOCUMENTS

| | | | | |
|---|---|---|---|---|
| 5,694,163 | A | 12/1997 | Harrison | 348/13 |
| 5,828,839 | A | 10/1998 | Moncrieff | 395/200.34 |
| 6,393,460 | B1 * | 5/2002 | Gruen et al. | 709/204 |
| 6,557,027 | B1 * | 4/2003 | Cragun | 709/204 |
| 6,564,244 | B1 * | 5/2003 | Ito et al. | 709/204 |
| 6,618,704 | B2 | 9/2003 | Kanevsky et al. | 704/271 |
| 6,643,686 | B1 * | 11/2003 | Hall | 709/206 |
| 7,099,867 | B2 * | 8/2006 | Okada et al. | 707/10 |
| 7,103,846 | B1 * | 9/2006 | Shafrir et al. | 715/751 |
| 7,111,043 | B2 * | 9/2006 | Kihara et al. | 709/204 |
| 7,120,668 | B2 * | 10/2006 | Manber et al. | 709/205 |
| 7,130,403 | B2 * | 10/2006 | Caspi et al. | 379/202.01 |
| 7,137,099 | B2 * | 11/2006 | Knight et al. | 717/100 |
| 7,383,307 | B2 * | 6/2008 | Kirkland et al. | 709/206 |
| 7,725,538 | B2 * | 5/2010 | Kirkland et al. | 709/204 |
| 7,882,195 | B2 * | 2/2011 | Kirkland et al. | 709/207 |
| 7,945,620 | B2 * | 5/2011 | Bou-Ghannam et al. | 709/204 |
| 2001/0025280 | A1 * | 9/2001 | Mandato et al. | 707/3 |
| 2002/0002586 | A1 * | 1/2002 | Rafal et al. | 709/205 |
| 2002/0188681 | A1 | 12/2002 | Gruen et al. | 709/204 |
| 2003/0212746 | A1 | 11/2003 | Fitzpatrick et al. | 709/206 |
| 2004/0186721 | A1 * | 9/2004 | Beynon et al. | 704/270 |
| 2005/0060643 | A1 * | 3/2005 | Glass et al. | 715/501.1 |
| 2006/0041848 | A1 * | 2/2006 | Lira | 715/805 |
| 2007/0203938 | A1 * | 8/2007 | Prahlad et al. | 707/102 |
| 2008/0228894 | A1 * | 9/2008 | Chen et al. | 709/207 |

\* cited by examiner

*Primary Examiner* — William Bashore
*Assistant Examiner* — David Phantana Angkool
(74) *Attorney, Agent, or Firm* — Yee & Associates, P.C.; Mark C. Vallone

(57) ABSTRACT

A method for grouping IM statements together into a plurality of topics and displaying the topics in separate windows comprising a Configuration Program (CP), a Topic Creation Program (TCP), and a Statement Classification Program (SCP). The CP allows a user to configure the global options for the present invention such as designating the parties authorized to create a topic, specifying whether the topic name and/or keywords are negotiable, and specifying whether icons should be displayed with the topic name. The TCP allows a user to create a topic by specifying the topic name, selecting a statement classification method, designating keywords to be used in searching the statements, and adding an icon to the topic name. When a statement is submitted to an IM channel, the SCP places the statement into one of the topics based on the statement classification method selected in the TCP.

30 Claims, 7 Drawing Sheets

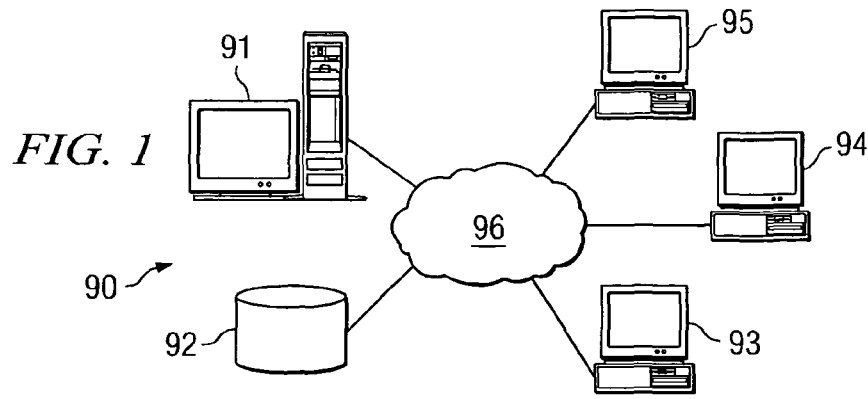
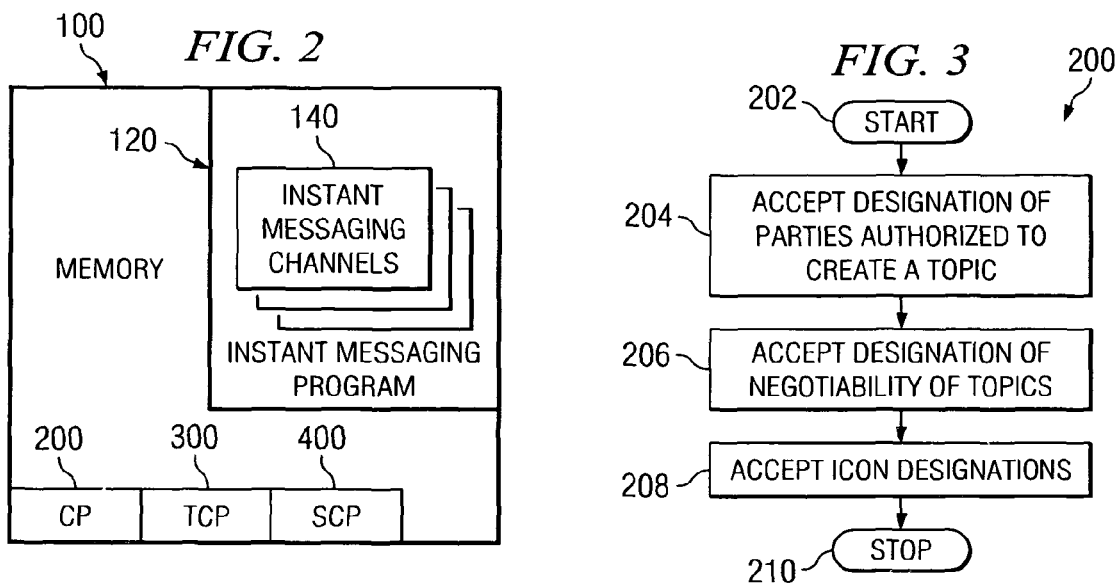

SYSTEM AND METHOD FOR IN-CONTEXT, TOPIC-ORIENTED INSTANT MESSAGING

BACKGROUND OF THE INVENTION

The present invention relates generally to instant messaging chat sessions, and specifically to a method for organizing the statements in a chat session by topics.

Instant messaging (IM) is a communication service that allows a user on one computer to send and receive text messages in real time with another user on a second computer connected to the first computer. The channel for this communication is often referred to metaphorically as a chat room, and the communication over the channel is referred to as chat. In some IM versions, two or more users engage in a chat outside the boundaries of a chat room and each user is able to view a chat transcript on one or more local computers. Each user has a list of contacts with whom they may want to chat. The IM service may alert the user when a contact, who is on the user's contact list, is also online. A chat may then be started, and once started, either the user or the contact can enter text that will appear on other user's displays.

In the workplace, IM chats often take place between people working on common projects. In engineering and computer design activities, it is common for one user to have ten or more multiple chats running simultaneously. Chats may describe simple information shared by two workers scheduling a meeting, or chats may contain complex discussions regarding proprietary information and critical decisions to keep a project moving forward. Chats may contain a high degree of historical data and proprietary knowledge that is useful not only to the participants but that may be useful to other workers within the organization who did not participate in the chat. Moreover, the knowledge and data captured in the chat transcript may be useful as historical data for future reference by the participants as well as others. Finally, in some areas, such as financial services, preservation of the chat transcript may be required by securities regulations.

IM chats are frequently directed to a plurality of different topics. For example, two coworkers may chat about a current project, a future project, and lunch plans all in the same chat. When a new coworker enters the chat room, the new coworker may not be interested in the current project or lunch, but rather be interested only in the future project. Currently, the new coworker must scroll through the entire chat transcript in order to review the statements concerning the new project. Scrolling through the entire chat transcript to review the statements associated with the new project is an inefficient use of the new coworker's time. It would be more efficient to create topics and classify the statements into the topics so that the new coworker only has to review the statements associated with the topics he is interested in. Creating topics for the statements in the chat transcript would assist all coworkers in following the shift from one topic to another topic. Unfortunately, current IM programs do not allow for the creation of topics for the statements within the chat transcript. Therefore, a need exists for a method for creating topics for the statements within the chat transcript.

The prior art has previously addressed the problem of creating topics for the statements within the chat transcript. For example, U.S. patent application Publication 2003/0212746 (the '746 application) to Fitzpatrick entitled "Threaded Text-Based Chat Collaboration" discloses a method for assigning topics to statements in a chat transcript. The '746 application invention requires each participant to assign a topic to each statement as the statements are submitted to the chat room. The participants may then scan through the chat transcript and review the statements with the topic that the participants are interested in.

There are at least two drawbacks to the method disclosed in the '746 application. First, the chat participants are required to identify the topic for each statement prior to submitting the statement. This creates an extra step for the chat participants. The extra step becomes burdensome when the chat focuses on a single topic for an extended period. The topical arrangement of statements would be less burdensome if the participants only had to indicate a topic when there is a topic shift. Moreover, the burden of assigning statements to the topics would be eliminated if the statements were automatically assigned to the topics. Consequently, a need exists for a method for grouping statements into topics in which the chat participants do not have to specify the topic for each statement submitted to the IM channel.

Second, using the '746 method, new chat participants are still required to read through the entire chat transcript in order to find the statements that the new chat participants are interested in. Chat participants would be able to quickly review the statements they are interested in if all of the statements pertaining to the topic that the participant is interested in were grouped together in a separate window on the chat GUI. The '746 application does not disclose a method for grouping together the statements for a single topic or displaying the grouped statements in a separate window. Consequently, a need exists for a method for grouping statements into topics in which the statements for each topic are displayed in separate windows on the chat GUI.

SUMMARY OF THE INVENTION

The present invention, which meets the needs identified above, is a method for grouping IM statements together into a plurality of topics and displaying the topics in separate windows. The software embodiment of the present invention comprises a Configuration Program (CP), a Topic Creation Program (TCP), and a Statement Classification Program (SCP). The CP allows a user to configure the global options for the present invention such as designating the parties authorized to create a topic, specifying whether the topic name and/or keywords are negotiable, and specifying whether icons should be displayed with the topic name. The TCP allows a user to create a topic by specifying the topic name, selecting a statement classification method, designating keywords to be used in searching the statements, and adding an icon to the topic name. The TCP also allows other parties to change the topic names and/or keywords if the topic names and/or keywords are negotiable. When a statement is submitted to an IM channel, the SCP places the statement into one of the topics based on the statement classification method selected in the TCP. The present invention includes a plurality of GUIs for using the programs described herein.

The present invention represents three improvements over the prior art. First, the chat participants are not required to assign a topic to every statement submitted to the IM channel. This lessens the burden of classifying every statement into a topic. Second, the present invention displays the statements associated with each topic in a separate window. This allows the chat participants to read the statements associated with a topic that the chat participant is interested in without having to read the entire chat transcript. Third, when the present invention is configured such that the statement classification method is by keyword, the statements are automatically classified into the topics. This relieves the chat participants of the burden of providing a topic for any of the statements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an illustration of a computer network used to implement the present invention;

FIG. 2 is an illustration of the memory associated with one of the computers in FIG. 1;

FIG. 3 is an illustration of the logic of the Configuration Program (CP) of the present invention;

FIG. 4 is an illustration of the Graphical User Interface (GUI) associated with the CP of the present invention;

DETAILED DESCRIPTION OF THE PREFERRED EMBODIMENT

Figure 5:
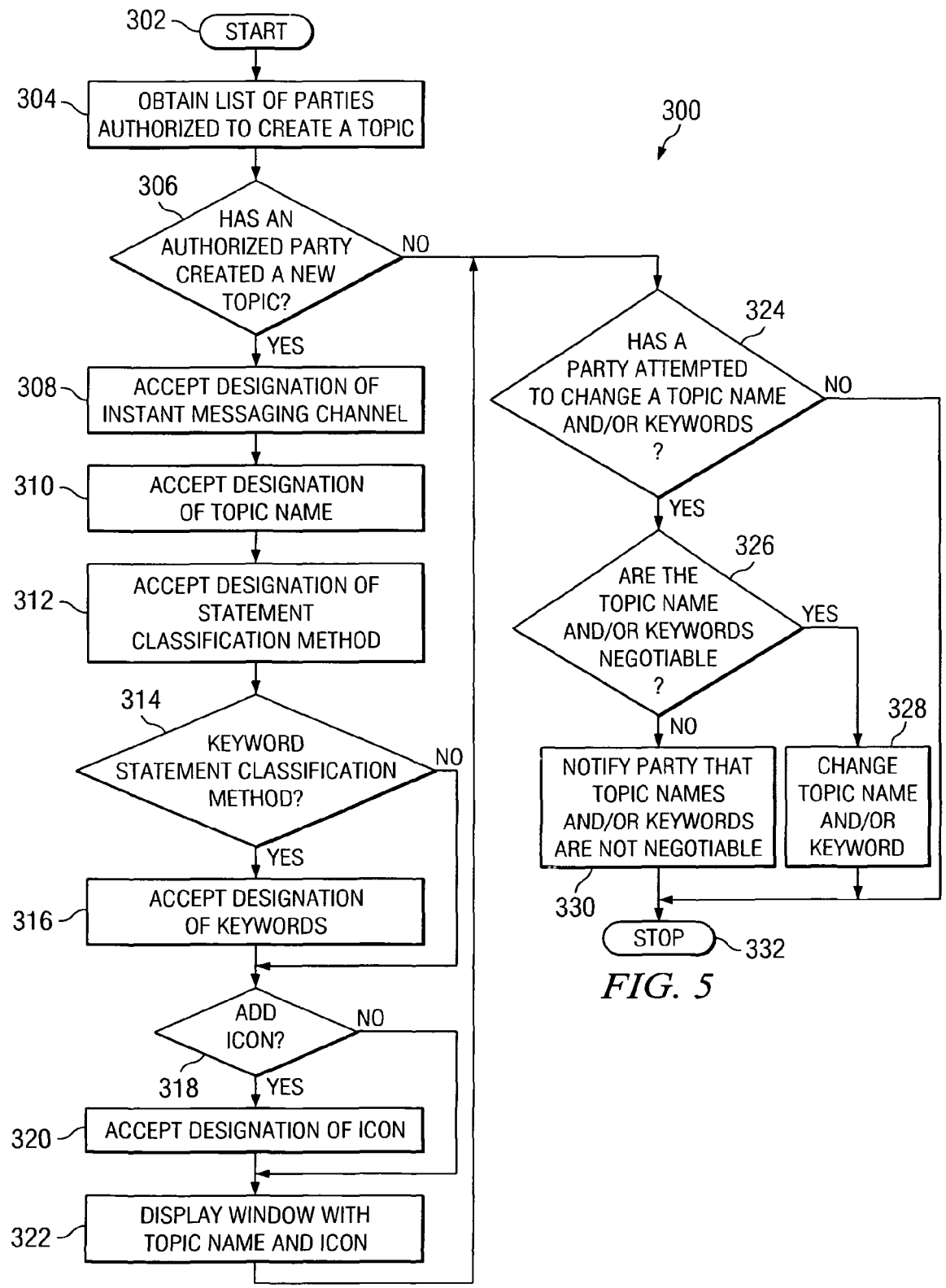
FIG. 5 is an illustration of the logic of the Topic Creation Program (TCP) of the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet or World Wide Web. Furthermore, computer network 90 depicted in FIG. 1 is intended as a representation of a possible operating network containing the present invention and is not meant as an architectural limitation.

The internal configuration of a computer, including connection and orientation of the processor, memory, and input/output devices, is well known in the art. The present invention is a methodology that can be embodied in a computer program. Referring to FIG. 2, the methodology of the present invention is stored within memory 100. Memory 100 comprises IM program 120, IM channels 140, Configuration Program (CP) 200, Topic Creation Program (TCP) 300, and Statement Classification Program (SCP) 400. Memory 100 may reside in any of the computers depicted in FIG. 1.

IM program 120 is an instant messaging program and is well known in the art. IM Program 120 is associated with a plurality of IM channels 140. As used herein, the term "IM channel" shall mean a channel or room that a plurality of participants submit statements into, thus engaging in IM or chatting. As used herein, the term "statement" shall mean a line of text submitted to an IM channel. The present invention is comprised of CP 200, TCP 300, and SCP 400. The present invention may be a stand-alone program or a plug-in to IM program 120.

FIG. 3 is an illustration of the logic of the Configuration Program (CP) 200 of the present invention. CP 200 is a program that allows a user to configure global setting for the present invention. CP 200 starts (202) whenever invoked by the user. CP 200 then accepts a user designation of the parties authorized to create a topic (204). As used herein, the term "topic" shall mean a term or terms used to identify the subject of a chat transcript or of a chat transcript segment. A topic may be created by a group leader or by any chat participant. Alternatively, a user may specify the parties which can create a topic. An organization may also limit topic creation for some topics and allow topic creation for other topics within a single chat. For example, an organization may want to limit the parties who can create a topic in a chat if there are established topics that the chat statements should conform to. A financial organization or corporation, for example, may establish topics such as administrative, accounting, 401(k) plan, IRA, financial management, mutual funds, stocks, and the like. An organization may not desire to regulate the topics for chats about where to go to lunch, but the organization may want to regulate the topics regarding projects and other work-related items so that all of the chat statements regarding a particular project get associated with a single topic. This would prevent individual chat participants from creating multiple topics for a single project and classifying the statements regarding an individual project into the different topics.

CP 200 then accepts a designation of the negotiability of the topic (206). The topics may be negotiable or non-negotiable. As used herein, the term "negotiable" means that parties other than the topic creator may modify the topic name. The keywords (see TCP 300 below) associated with the topic name may also be negotiable. The topic name modification may optionally be approved by the topic name creator or by a group leader. Persons of ordinary skill in the art will appreciate that topic negotiability involves two distinct concepts: deciding whether the topic is negotiable and negotiating the topic names. Persons of ordinary skill in the art will appreciate that negotiability, as used within this application, may encompass either one or both of these concepts. CP 200 then accepts an icon designation (208). The topic names associated with the present invention may be configured to be displayed with an icon. The icon is a small picture that represents the topic, such as using a lunch pail icon to represent the lunch topic. CP 200 then ends (210).

FIG. 4 is an illustration of Graphical User Interface (GUI) 250 associated with CP 200. GUI 250 allows the user to designate the parties authorized to create a topic name in section 252. GUI 250 allows the user to designate whether the topic names are negotiable in section 254. GUI 250 allows the user to specify whether to display icons with the topic name in section 256. The user can submit the choices made in GUI 250 using submit button 258 or cancel the choices using cancel button 260.

FIG. 5 is an illustration of the logic of Topic Creation Program (TCP) 300. TCP 300 starts (302) whenever an IM program 120 is running. TCP 300 obtains the list or parties authorized to create a topic name (304). The parties authorized to create a topic name are designated in step 204 of CP 200. TCP 300 then determines whether an authorized party has created a new topic name (306). If an authorized party has not created a new topic name, TCP 300 proceeds to step 324. If an authorized party has created a new topic name, TCP 300 accepts a user designation of an IM channel (308). TCP 300 then accepts input of a topic name (310). The topic name is the name that is displayed at the top of the GUI for the topic. The topic names may be automatically accepted by TCP 300 or may be accepted on a line-by-line basis. TCP 300 then proceeds to step 312.

At step 312, TCP 300 then accepts a user designation of a statement classification method (312). As used herein, the term "statement classification method" shall mean the methodology used to classify the statements. When the statements are submitted to the IM channel, SCP 400 classifies the messages into topics based upon the statement classification method assigned to the topics. Statement classification methods include by author, by group leader, and by keyword. Persons of ordinary skill in the art will appreciate that other statement classification methods may be included within the present invention. Classifying the statements by author means that the author of the statement determines which topics that the statement should be included in. The author may select one or a plurality of topics for the message by placing a topic tag, also known as a hotkeyword, within the statement, such as "A1" or "L:" to indicate that the message should be associated with topic A1 or the topic "lunch." The statement is then placed in the appropriate topic window(s). If desired, the topic tag may be negotiable between the chat participants. All statements subsequent to the statement with the topic tag are placed into the same topic. Alternatively, the topic tag can be automatically created when a chat participant begins typing a statement, subject to modification by the author of the statement. Persons of ordinary skill in the art will appreciate that a group leader or other user may limit the name, length, and alphanumeric characters associated with a topic tag. The author or group leader changes topics by inserting a new topic tag into a subsequent statement. The author or the group leader may optionally classify the statement after submission to the IM channel. If the statement classification method is by keyword, then SCP 400 searches the statements for keywords and automatically associates the statement with a topic if the statement contains the topic's keywords. TCP 300 then proceeds to step 314.

At step 314, TCP 300 determines whether the user has selected the keyword statement classification method (314). If the user has not selected the keyword statement classification method, then TCP 300 proceeds to step 318. If the user has selected the keyword statement classification method, then TCP 300 accepts a user designation of at least one keyword (316) and proceeds to step 318. The keywords are words that are closely related to the topics. For example, if the topic was "stocks," the keywords might be "stock," "buy," or "sell." Persons of ordinary skill in the art will appreciate that logical search terms may be used to supplement the keywords, such as "buy w/3 stock" meaning that the keywords are the word "buy" within three words of the word "stock." Persons of ordinary skill in the art are aware of other logical search terms. TCP 300 then determines whether the present invention is configured to display an icon with the topic name (318). The user specified whether to display an icon with the topic name in step 208 of CP 200. If TCP 300 determines that the present invention is not configured to display icons with the topic name, TCP 300 proceeds to step 324. If TCP 300 determines that the present invention is configured to display icons with the topic name, TCP 300 accepts input of an icon (320). The icon input is typically a graphics file, such as those ending in the .jpg, .gif, or .bmp file suffixes. TCP 300 then displays a new window with the topic name and icon, if TCP 300 is so configured, (322) and proceeds to step 324.

At step 324, TCP 300 determines whether a party has attempted to change a topic name and/or any of the keywords associated with the topic name (324). If TCP 300 determines that a party has not attempted to change a topic name or keyword, then TCP 300 ends (332). If TCP 300 determines that a party has attempted to change a topic name and/or keyword, then TCP 300 determines whether the topic name and/or keywords are negotiable (326). The negotiability of the topic names and/or keywords is specified in step 206 of CP 200. If the topic name and/or keywords are not negotiable, then TCP 300 notifies the party attempting to change the topic name and/or keywords that the topic name and keywords are not negotiable (330) and ends (332). If the topic name and/or keywords are negotiable, TCP 300 changes the topic name and/or keyword (328) and ends (332). At step 328, TCP 300 may optionally treat the change in the topic name and/or keywords as a proposed change, and send the proposed change in the topic name and/or keywords to the group leader or another party for approval prior to implementing the proposed change in the topic name and/or keywords. In such an embodiment, the group leader or other party may accept the change, reject the change, or modify the change.

Figure 6:
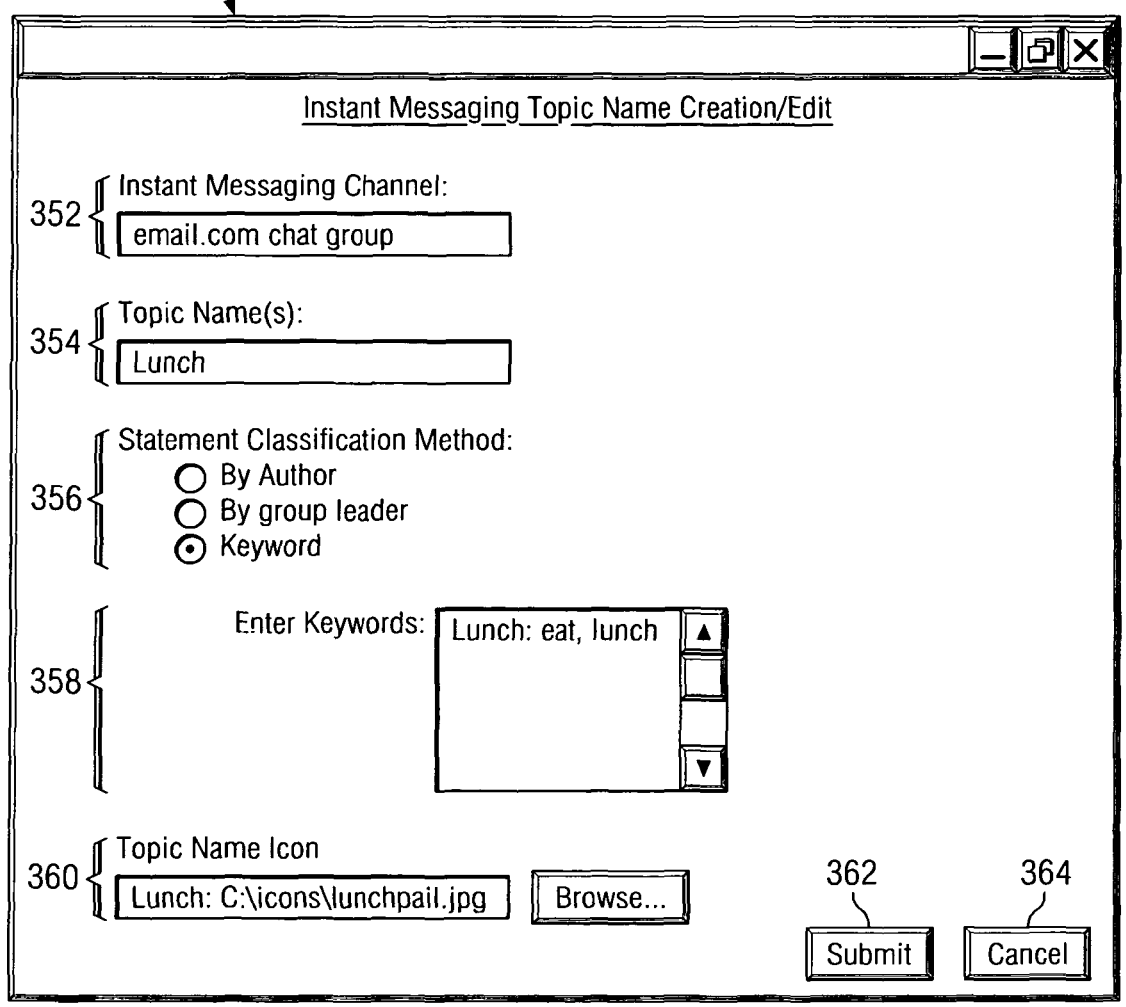
FIG. 6 is an illustration of the GUI associated with the TCP of the present invention.

FIG. 6 is an illustration of GUI 350 associated with TCP 300. GUI 350 allows a user to designate the IM channel in section 352. GUI 350 allows a user to designate the topic name in section 354. GUI 350 allows a user to designate the statement classification method in section 356. GUI 350 allows a user to designate the keywords for the keyword statement classification method in section 358. GUI 350 allows a user to designate the icon associated with the topic name in section 360. The user can submit the choices made in GUI 350 using submit button 362 or cancel the choices using cancel button 364.

Figure 7:
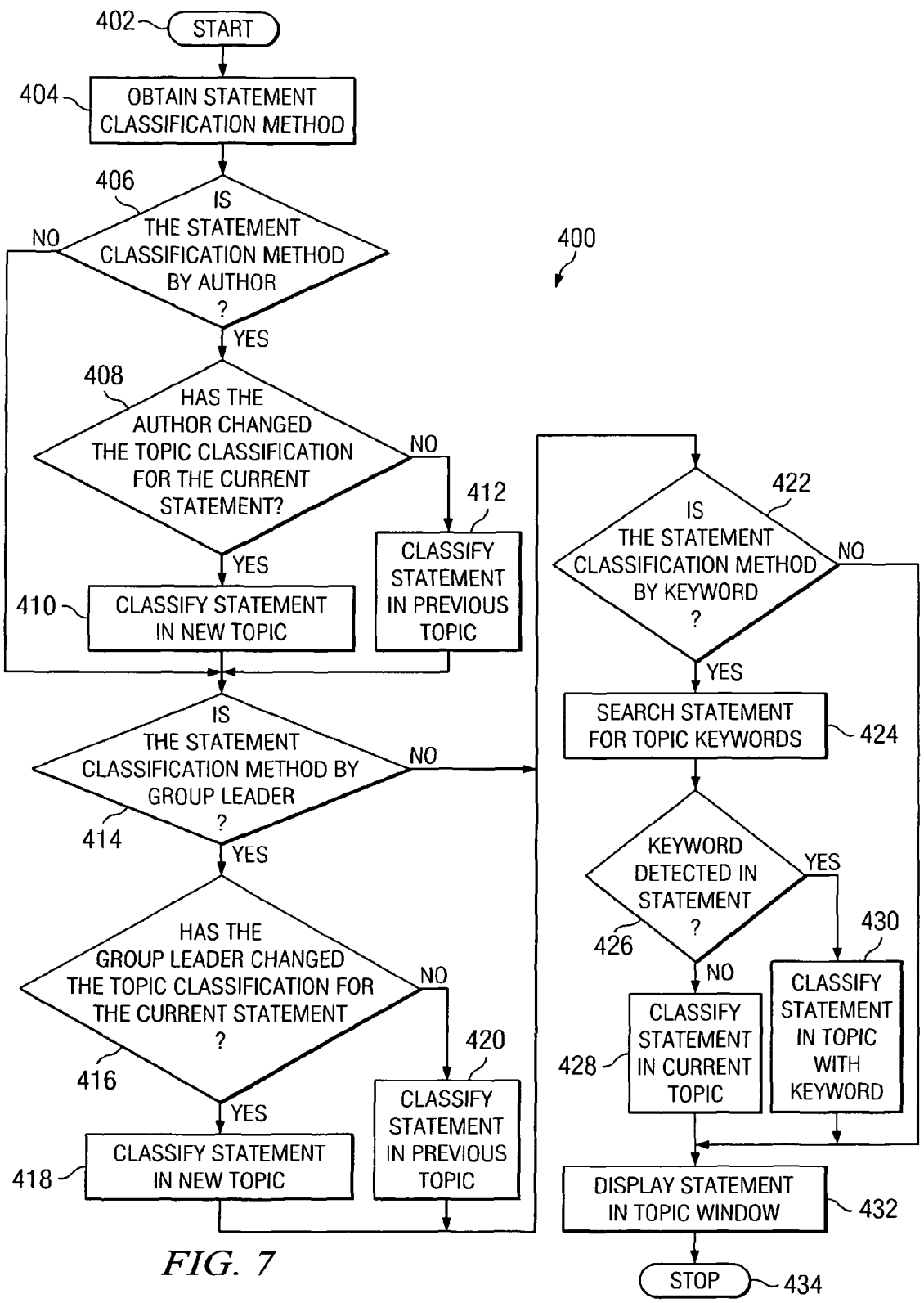
FIG. 7 is an illustration of the logic of the Statement Classification Program (SCP) of the present invention.

FIG. 7 is an illustration of the logic of Statement Classification Program (SCP) 400. SCP 400 is a computer program that classifies the statements into topics. SCP 400 starts (402) whenever a statement is submitted to an IM channel. SCP 400 obtains the statement classification method designated in step 312 of TCP 300 (404). If the statement classification method is by author or by group leader, SCP 400 allows the author or group leader to classify all of the statements within a particular topic until he changes the topic, at which point all of the subsequent statements will go to the new topic. This classification method allows the author or group leader to classify the statements into topics without specifying the topic for each individual statement. Persons of ordinary skill in the art will appreciate that the present invention could be configured so that the author or group leader may specify or change the topic for a statement after the statement has been submitted to the IM channel. SCP 400 then proceeds to step 406.

At step 406, SCP 400 determines whether the classification method is by author (406). If the statement classification method is not by author, then SCP 400 proceeds to step 414. If the statement classification method is by author, SCP 400 determines whether the author has changed the topic classification for the current statement (408). In other words, SCP 400 determines whether the author has inserted a topic tag into the present statement. The topic tag indicates that the current statement belongs to a new topic. The composition of the topic tag may be an indicator such as "A1." Other topic tag compositions may be determined by persons of ordinary skill in the art. If the author has changed the topic classification for the current statement, then SCP 400 classifies the statement in the new topic designated by a topic tag (410) and proceeds to step 414. If at step 408 the author has not changed the topic classification for the current statement, then SCP 400 classifies the statement in the previous topic (412) and proceeds to step 414.

At step 414, SCP 400 determines whether the classification method is by group leader (414). If the statement classification method is not by group leader, then SCP 400 proceeds to step 422. If the statement classification method is by group leader, SCP 400 determines whether the group leader has changed the topic classification for the current statement (416). In other words, SCP 400 determines whether the group leader has inserted a topic tag into the present statement. If the group leader has changed the topic classification for the current statement, then SCP 400 classifies the statement in the new topic designated by a topic tag (418) and proceeds to step 422. If at step 416 the group leader has not changed the topic classification for the current statement, then SCP 400 classifies the statement in the previous topic (420) and proceeds to step 422.

At step 422, SCP 400 determines whether the classification method is by keyword (422). If the statement classification method is not by keyword, then SCP 400 proceeds to step 432. If the statement classification method is by keyword, SCP 400 searches the statement for topic keywords (424). The topic keywords were entered in step 316 of TCP 300. SCP 400 then determines whether a keyword was detected in the current statement (426). In other words, SCP 400 determines if the current statement contains, any of the keywords designated by the user. If a keyword was detected in the current statement, then SCP 400 classifies the statement in the topic associated with the keyword (430) and proceeds to step 432. If at step 426 a keyword was not detected in the current statement, then SCP 400 classifies the statement in the previous topic (428). SCP 400 then displays the statement in the window associated with the statement's topic (432) and ends (434). While the preferred embodiment describes the present invention in terms of assigning statements to topics at the time of statement creation, persons of ordinary skill in the art will appreciate that statements may be assigned to topic before, during, or after the statements or topics are created.

Figure 8:
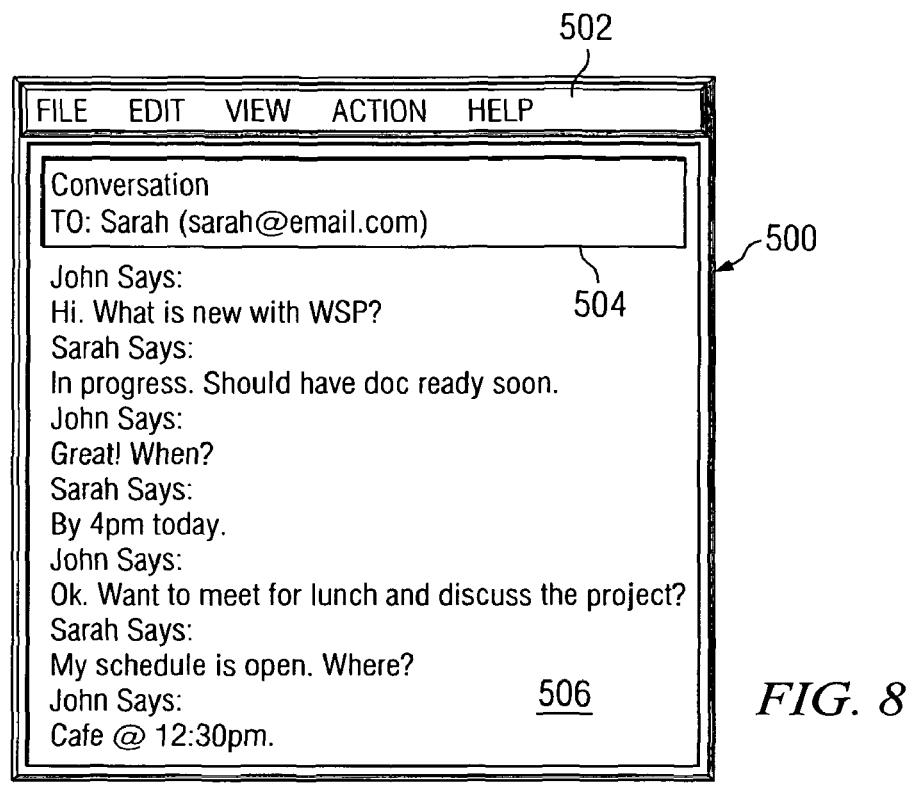
FIG. 8 is an illustration of an IM GUI in the absence of the present invention.

The present invention includes the ability for individual chat participants to configure their GUIs according to their personal preferences. A chat participant may alter the arrangement and configuration of his GUI without altering the GUIs of the other chat participants. The chat participant may also choose to view the transcript in the original format, if desired. FIGS. 8 through 9E illustrate the GUIs that may be selected by a chat participant using the present invention. FIG. 8 depicts chat window 500 in the absence of the present invention. Chat window 500 has utility section 502 from which the user can select actions such as file, edit, view, action or help. Chat identifier area 504 shows with whom the chat is being conducted. Chat transcript area 506 displays the conversation between the user and the selected chat participant.

Figure 9A:
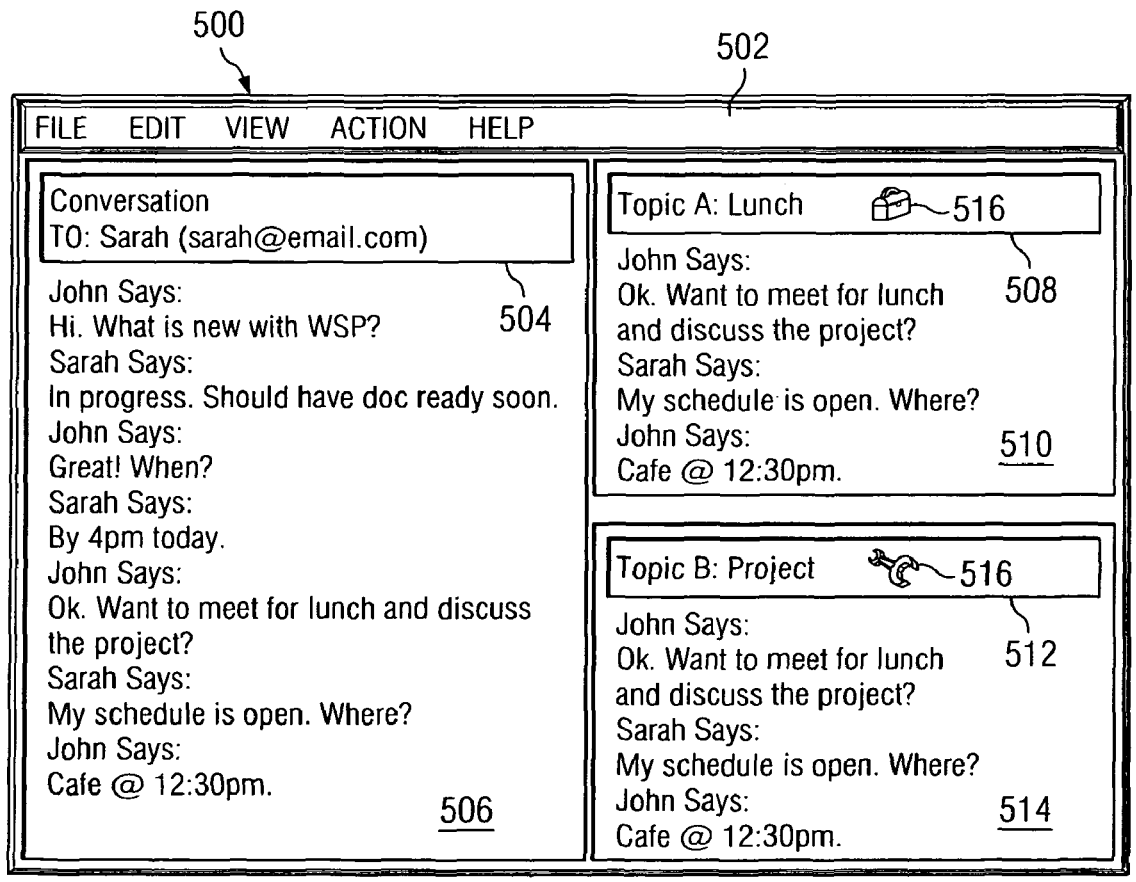
FIG. 9A is an illustration of an IM GUI of the present invention with two topic segments in vertical alignment with the chat transcript.
Figure 9B:
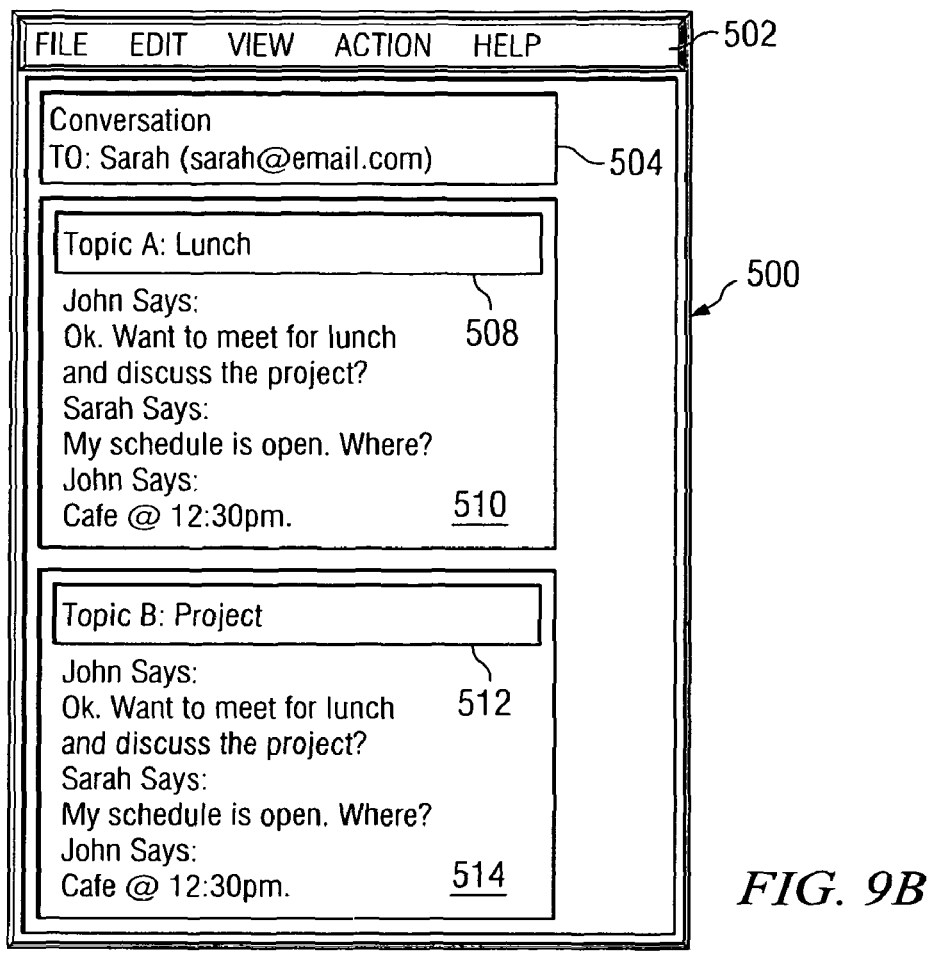
FIG. 9B is an illustration of an IM GUI of the present invention with two topic segments in vertical alignment without the chat transcript.
Figure 9C:
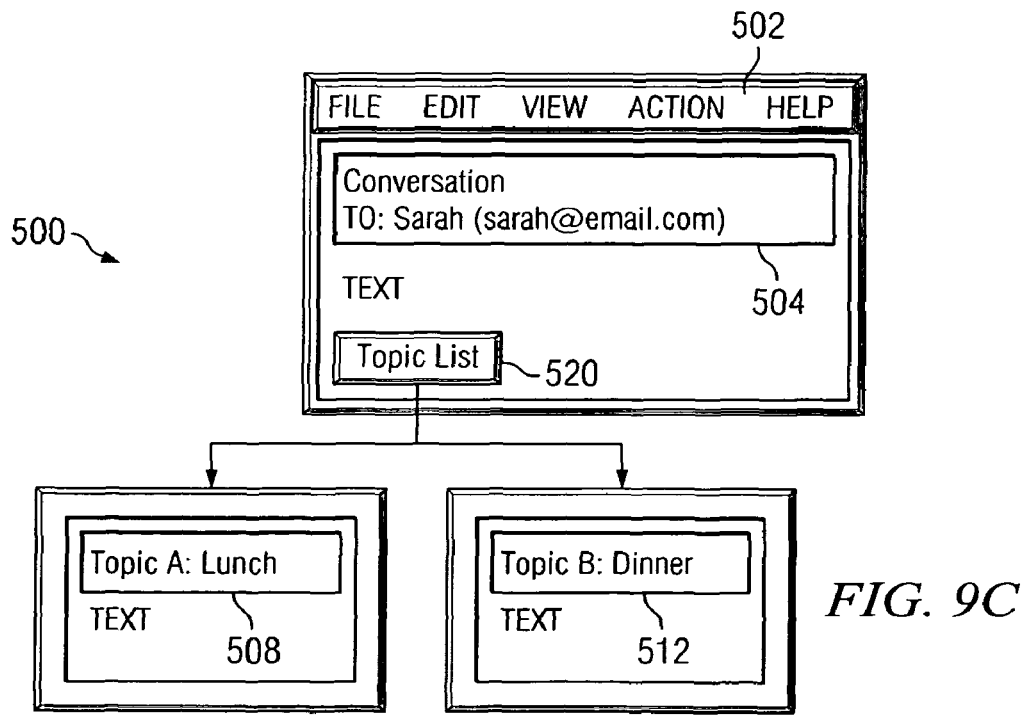
FIG. 9C is an illustration of an IM GUI of the present invention with a topic list link and two subtopic display headings.
Figure 9D:
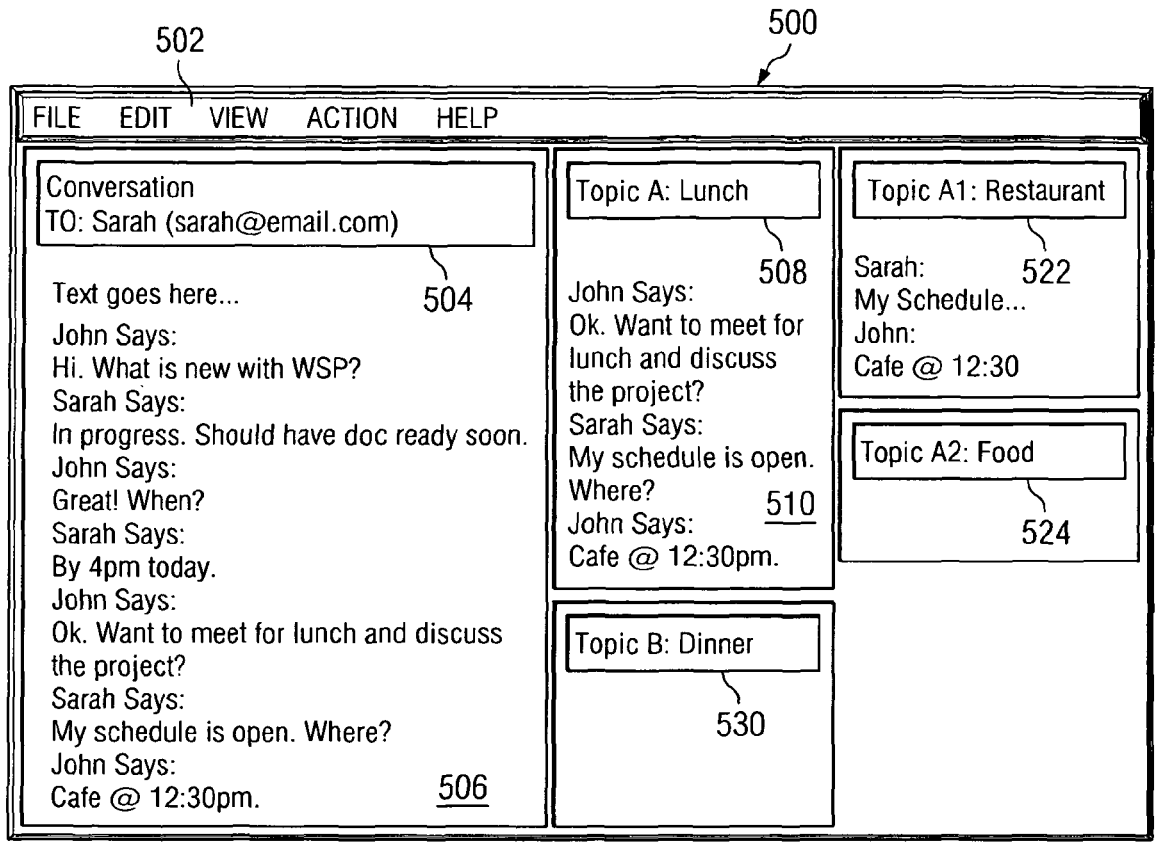
FIG. 9D is an illustration of an IM GUI of the present invention with topics, subtopics and cascading window implementation.
Figure 9E:
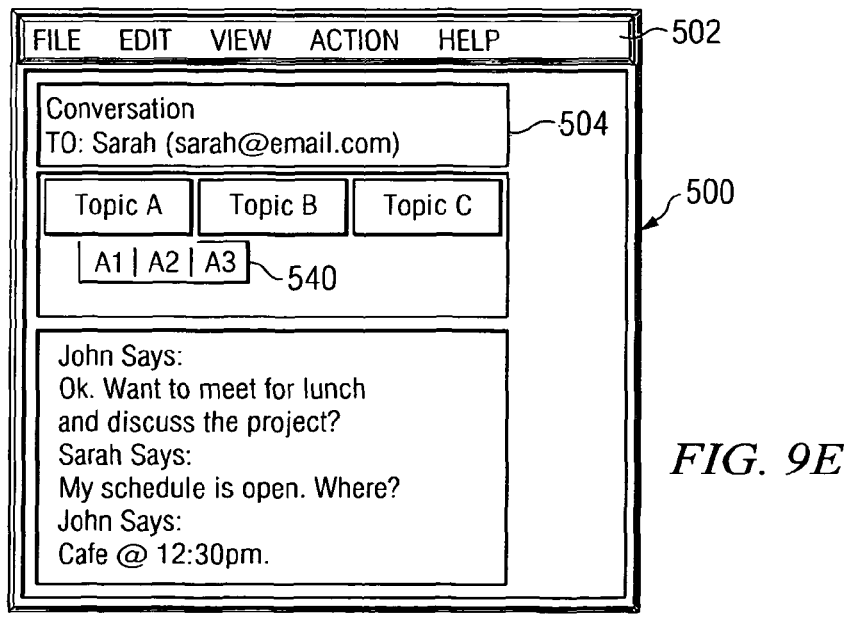
FIG. 9E is an illustration of an IM GUI of the present invention with topics and tabs for subtopic display.

FIG. 9A depicts a chat window 500 created by the present invention. Next to chat transcript 506, a first transcript segment 510 for Topic A 508 and a second transcript segment 514 for Topic B 512 are displayed. FIG. 9A also displays icons 516 associated with each topic name. FIG. 9B shows a variation with utility area 502, chat identifier area 504, first transcript segment 510, and second transcript segment 514. FIG. 9C shows a variation with topic tag list 520 displayed at the end of the chat transcript. When topic tag list 520 is activated such as by clicking on one of the topics tags, the selected topic tag, such as topic A 508 or topic B 512, is displayed with the corresponding transcript segment. An additional variation is shown in FIG. 9D where topic A 508 is further divided according to subtopics A1 522 and A2 524. The division into subtopics can be extended to any number of levels of subtopics. FIG. 9E shows a method of displaying topics and subtopics in one area 540 above the chat transcript. In area 540, the subtopics are displayed as tabs in order to save space. The topics and tabs may be color coded and the subtopics may be layered to maximize the use of space.

The windows depicted in FIGS. 9A through 9E may be attached to each other to facilitate organized movement on the chat participant's desktop. For example, referring to FIG. 9D, a chat participant may connect the window for topic A with the windows for subtopics A1 and A2. Thus, the chat participant may move topic A around with its subtopics. The connected windows may be tiled, resized, moved, minimized, or maximized, as a single unit. If desired, the chat participant may later disconnect the windows so that the disconnected windows can be individually modified.

Persons of ordinary skill in the art will appreciate that the present invention preserves the original chat transcript and the conversation flow therein while simultaneously grouping the statements associated with particular topics into individual windows. As such, the present invention may save the chat transcript as a whole or may save only the portions of a chat transcript associated with a particular topic. For example, a chat participant may desire to save only the section of the chat associated with the project, and not the section of the chat associated with lunch. As such, the GUIs of the present invention may be configured with buttons that allow a chat participant to save all or part of the chat transcript to an XML file for later access or exportation to another application. The user could modify the data in the XML file as desired. Persons of ordinary skill in the art will appreciate that the XML files can be compressed or zipped to minimize the space required to store the XML file.

Persons of ordinary skill in the art will also appreciate that the present invention may be configured such that the topics include sub-topics. In such an embodiment, the statements appear in the chat transcript, the topic, and the subtopic. Persons of ordinary skill in the art will also appreciate that the topic classification disclosed herein leads to a hierarchical arrangement of topics and subtopics. Consequently, a chat participant would be able to collapse or expand branches of the topics and subtopics to display only the desired topics and subtopics on the display screen. As such, the GUIs of the present invention may be configured with buttons that allow a chat participant to expand and collapse some or all of the branches of each topic and subtopic. Finally, persons of ordinary skill in the art will appreciate that the topics of the present invention may also be determined using the topic tags disclosed in U.S. patent application Ser. No. 10,824,811, incorporated herein by reference.

In another embodiment of the present invention, the participants of a chat session may invite another chat participant to participate in a particular topic of the chat and limit the other chat participant's access to certain topics. Limited access would be useful for including a new participant in the lunch topic, but excluding the new participant from the sensitive information in the project topic. A new participant who has access to a particular topic would have access to the subtopics associated with that topic, unless the group leader or other access-granting user limits the access to the subtopics.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method comprising:
a computer creating a plurality of topics;
the computer assigning a statement classification method to each of the plurality of topics;
the computer submitting a plurality of instant messaging statements to an instant messaging channel;
the computer associating each of the plurality of instant messaging statements with one of the plurality of topics in accordance with an assigned statement classification method;
the computer grouping together each of the plurality of instant messaging statements having a common topic into a plurality of topic groups;
the computer displaying each of the plurality of topic groups in a separate window on a computer display;
wherein each of the topics comprises a topic name;
wherein the topic name of each of the topics is negotiable, thereby allowing any participant to propose a change to the topic name; and
wherein the change is subject to an approval by a group leader.

2. The method of claim 1 further comprising:
wherein the assigned statement classification method is by a keyword;
the computer assigning the keyword to one of the topics;
the computer determining whether each of the plurality of instant messaging statements contains the keyword; and
the computer responsive to a determination that one of the plurality of instant messaging statements contains the keyword, associating an instant messaging statement containing the keyword with a topic associated with the keyword.

3. The method of claim 1 further comprising:
wherein the statement classification method is by an author of an instant messaging statement, the author being one of a plurality of participants in an instant messaging session;
the computer associating the instant messaging statement with a first topic by inserting a first topic tag into the instant messaging statement;
the computer associating a plurality of subsequent instant messaging statements with the first topic; and
the computer ending an association of the plurality of subsequent instant messaging statements with the first topic by inserting a second topic tag into one of the plurality of subsequent instant messaging statements.

4. The method of claim 3 wherein the author inserts the second topic tag into the one of the plurality of instant messaging statements to change the first topic to a second topic.

5. The method of claim 3 wherein the first topic tag is automatically inserted into the plurality of subsequent instant messaging statements.

6. The method of claim 1 further comprising:
wherein the statement classification method is by the group leader;
the computer associating an instant messaging statement with a first topic by inserting a first topic tag into the instant messaging statement;
the computer associating a plurality of subsequent instant messaging statements with the first topic; and
the computer ending an association of the plurality of subsequent instant messaging statements with the first topic by inserting a second topic tag into one of the plurality of subsequent instant messaging statements.

7. The method of claim 6 wherein the group leader inserts the second topic tag into one of the plurality of instant messaging statements to change the first topic to the second topic.

8. The method of claim 6 wherein the computer accepts a designation of a topic name only from the group leader.

9. The method of claim 6 wherein an alteration of a first configuration of a first chat participant's graphical user interface does not alter a second configuration of a second chat participants' graphical user interface.

10. The method of claim 9 wherein the first chat participant's graphical user interface comprises a mechanism for expanding and collapsing a plurality of topic windows.

11. The method of claim 10 wherein a second chat participant is granted access to a first topic but is not granted access to a second topic.

12. The method of claim 11 wherein a plurality of the first chat participant's windows connect together for a common movement and action.

13. The method of claim 12 wherein the first chat participant can save a chat transcript only relating to a designated topic.

14. A program product comprising a memory and a set of instructions stored in the memory, the instructions, when carried out by a processor, implement a method for grouping a plurality of instant messaging statements into a plurality of topic groups, the method comprising:
the processor creating a plurality of topics, each topic comprising a topic name;
the processor assigning a statement classification method to each of the plurality of instant messaging statements;
the processor associating each of the instant messaging statements with one of the plurality of topics based on an assigned statement classification method; and
the processor grouping together each of the plurality of instant messaging statements having a common associated topic into a corresponding topic group;
wherein the topic name of each of the topics is negotiable, thereby allowing any participant to propose a change to the topic name; and
wherein the change is subject to an approval by a group leader
wherein the statement classification method is by a keyword search.

15. The program product of claim 14 wherein each of the plurality of topic groups is displayed in a separate window on a display.

16. The program product of claim 14, wherein the method further comprises:
the processor assigning a keyword to one of the plurality of topics;
the processor determining whether each of the plurality of instant messaging statements contains the keyword; and
the processor, when an instant messaging statement contains the keyword, associating the instant messaging statement with a topic associated with the keyword.

17. The program product of claim 16 wherein a chat participant does not have to assign one of the topics to each of the plurality of instant messaging statements.

18. The program product of claim 16, wherein the method further comprises the processor inserting a topic tag into a plurality of subsequent instant messaging statements.

19. The program product of claim 14, wherein the statement classification method is by author of a statement, the author being one of a plurality of participants, and wherein the method further comprises:

the processor associating an instant messaging statement with a first topic by inserting a first topic tag into the instant messaging statement;

the processor associating a plurality of subsequent instant messaging statements with the first topic; and the processor ending the association of the plurality of subsequent instant messaging statements with the first topic by inserting a second topic tag into one of the plurality of subsequent instant messaging statements.

20. The program product of claim 19 wherein an author inserts the second topic tag into one of the plurality of subsequent instant messaging statements to change the first topic to a second topic.

21. The program product of claim 14, wherein the statement classification method is by the group leader, and wherein the method further comprises:

the processor associating an instant messaging statement with a first topic by inserting a first topic tag into the instant messaging statement;

the processor associating a plurality of subsequent instant messaging statements with the first topic; and the processor ending an association of the plurality of subsequent instant messaging statements with the first topic by inserting a second topic tag into one of the plurality of subsequent instant messaging statements.

22. The program product of claim 21 wherein the group leader inserts the second topic tag into one of the plurality of subsequent instant messaging statements to change the first topic to a second topic.

23. The program product of claim 21 wherein the processor accepts a designation of a topic name only from the group leader.

24. The program product of claim 14 wherein the topic name is displayed with an icon.

25. The program product of claim 14 wherein an alteration of a first configuration of a first chat participant's graphical user interface does not alter a second configuration of a second chat participants' graphical user interface.

26. The program product of claim 14 wherein a chat participant's graphical user interface comprises a mechanism for expanding and collapsing a plurality of topic windows.

27. The program product of claim 14 wherein a chat participant is granted access to a first topic group but is not granted access to a second topic group.

28. The program product of claim 14 wherein a plurality of a chat participant's windows connect together for a common movement and action.

29. The program product of claim 14 wherein a chat participant can only save a chat transcript relating to a designated topic.

30. A computer system comprising:

a processor;

a memory coupled to the processor;

a set of instructions stored in the memory, the set of instructions, when executed by the processor, implement a method for grouping a plurality of instant messaging statements into a plurality of topic groups, the method comprising:

the processor creating a plurality of topics, each topic comprising a topic name;

the processor assigning a statement classification method to each of the plurality of topics;

the processor associating each of the plurality of instant messaging statements with one of the plurality of topics based on an assigned statement classification method;

the processor grouping each of the plurality of instant messaging statements having a common topic into the plurality of topic groups; and the processor displaying each of the plurality of topic groups in a separate window in a display;

wherein the topic name of each of the topics is negotiable, thereby allowing a participant to propose a change to the topic name; and wherein the proposal is subject to approval by a group leader.

* * * * *